Nov. 8, 1966　　　　　R. M. ROWND　　　　　3,283,395
ROLLER WITH HANDLE AND ANTI-STICK PLASTIC COATING
Filed Nov. 29, 1963
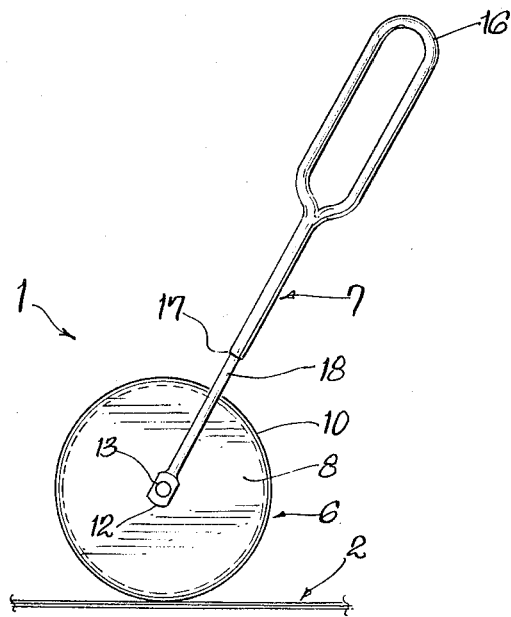
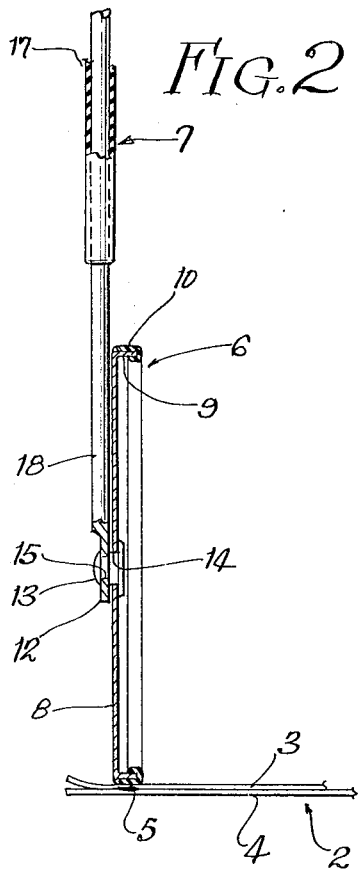
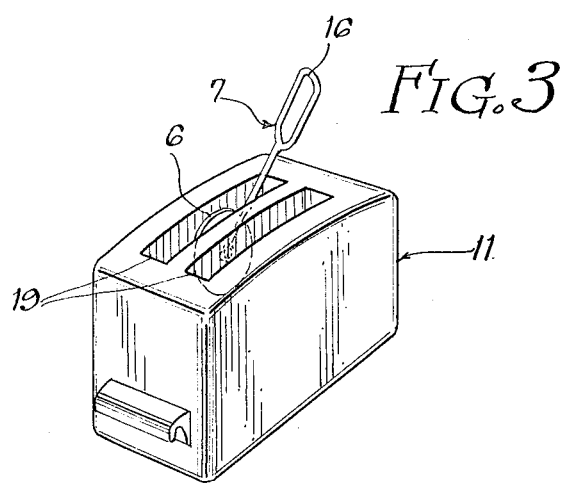
INVENTOR.
Robert M. Rownd
BY Dorris, McDougall & Hersh
Att'ys

United States Patent Office 3,283,395
Patented Nov. 8, 1966

3,283,395
ROLLER WITH HANDLE AND ANTI-STICK
PLASTIC COATING
Robert M. Rownd, Nashville, Tenn., assignor to Aladdin Industries, Incorporated, Chicago, Ill., a corporation of Illinois
Filed Nov. 29, 1963, Ser. No. 326,767
5 Claims. (Cl. 29—110.5)

This invention relates to a new and improved device for heat sealing or closing bags or the like made of plastic film or similar material which is capable of being heat sealed or welded by the application of heat and pressure.

One general object of the present invention is to provide a new and improved heat sealing device which comprises a roller adapted to be heated by placing the roller in a household toaster, whereupon the heated roller may be employed to heat seal plastic bags or sheets.

A further object is to provide a heat sealing device of the foregoing character in which the outer periphery of the roller is provided with a coating to prevent the heated plastic film from sticking to the roller.

Another object is to provide a new and improved heat sealing device of the foregoing character having a handle which will withstand the heat of the toaster, yet is insulated against the passage of both heat and electricity.

A further object is to provide a heat sealing device of the foregoing character which is very inexpensive, so much so that it may be given away as a premium or promotional item.

Further objects and advantages of the present invention will appear from the following description, taken with the accompanying drawings in which:

FIG. 1 is a side elevational view of a heat sealing device to be described as an illustrative embodiment of the present invention.

FIG. 2 is a fragmentary enlarged elevational section of the heat sealing device.

FIG. 3 is a prespective view showing the manner in which the roller of the heat sealing device may be heated in a household toaster.

The drawings illustrate a heat sealing device 1 which may be employed for heat sealing bags 2 made of plastic film or other material adapted to be heat sealed. It will be seen that the bag 2 comprises upper and lower walls 3 and 4 made of plastic film, such as polyethylene or the like. The heat sealing device 1 is adapted to form a heat sealed or welded seam 5 between the walls 3 and 4.

It will be seen that the heat sealing device 1 comprises a roller 6 which is rotatably mounted on a handle 7. The illustrated roller 6 is made of thin sheet metal and is in the form of a disc 8 having a generally cylindrical flange or rim 9, which is quite narrow but is made wide enough to avoid any tendency of the roller to cut off the sheets of plastic film, rather than heat sealing them together.

The roller 6 may be provided with a coating or covering 10 to prevent the plastic film from sticking to the heated roller. The coating 10 also provides electrical insulation. The coating 10 may be made of materials such as Teflon or silicone rubber which will not stick to heated plastic films and which will withstand the heating of the roller in a household toaster 11, as shown in FIG. 3. The entire roller 6 may be covered by the coating 10, but, as illustrated, the coating 10 covers only the outside of the roller or flange 9, the edge of the flange 9, and a portion of the inside of the flange.

The illustrated handle 7 is made of wire which is round in cross section. The wire is preferably made of steel or other material which has a relatively low heat conductivity. As shown, the handle 7 has a lower or inner end portion 12 which is flattened. A rivet 13 or other fastener is employed for rotatably connecting the roller 6 to the flattened end portion 12. The rivet extends through openings 14 and 15 in the disc 8 and the flattened end portion 12.

The outer end of the handle 7 is bent into an oval-shaped loop 16 which provides a convenient grip portion adapted to be held in the hand of the user.

Preferably, the handle 7 is provided with a covering or coating 17 of plastic or other suitable material, adapted to afford both electrical and heat insulation. The coating 17 should be capable of withstanding the heat of the toaster. It has been found that the coating 17 may very advantageously be made of an epoxy composition.

The entire handle 7 may be covered by the coating 17. However, in the illustrated construction, the coating 17 is confined to the loop or grip portion 16 and part of the straight shank portion 18 which extends between the loop portion 16 and the flattened end portion 12.

In use, the heat sealing device 1 is heated, preferably by inserting the roller 6 and the lower portion of the handle 7 into one of the bread slots 19 in the toaster 11, which may be of the usual automatic variety commonly employed for toasting bread. The toaster 11 is energized or started in the same manner as if slices of bread were were being toasted. In fact, one slice of bread may be toasted in one of the bread slots 19 while the roller 6 is being heated in the other bread slot. The toaster 11 goes through its heating cycle and shuts itself off in the usual manner.

The heat supplied by the toaster 11 is sufficient to heat the roller 6 to a heat sealing temperature. The roller 6 is then employed to heat seal the bag 2, in which a sandwich or other food has been placed.

The heat sealing device 1 is operated by holding the grip portion 16 of the handle 7 in the hand of the user and rolling the roller 6 along the superimposed walls 3 and 4 of the bag, while the bag is supported on a counter top or other supporting surface. The pressure and heat supplied by the roller 6 causes the walls 3 and 4 of plastic film to be welded or heat sealed together. The heat of the roller 6 softens the plastic film, but the coating 10 on the roller prevents the softened film from sticking to the edge of the roller.

By the use of the heat sealing device, sandwich bags or the like may be sealed much more tightly than would otherwise be possible, so that the sandwich in the bag will be kept fresh for a much longer period of time. The heat sealing device may also be employed to seal the edges of sheets of wrapping material made of plastic film or the like.

The heat sealing device may be manufactured at extremely low cost, so much so that the heat sealing device may appropriately be given away as a premium or promotional item. It is often possible to fabricate some of the components of the heat sealing device from scrap material which otherwise would be wasted.

Various modifications, alternative constructions and equivalents may be employed without departing from the true spirit and scope of the invention, as exemplified in the foregoing description and defined in the following claims.

I claim:
1. In a heat sealing device
   the combination comprising a roller made of sheet metal and having a disc portion formed with a generally cylindrical peripheral flange,
   an elongated handle having a flat inner end portion,
   pivot means rotatably connecting said disc portion to said flat end portion,
   said handle having a grip portion at the outer end thereof, said handle having a shank portion extending between said grip portion and said flat end portion,
a heat-resistant plastic coating covering the grip portion of said handle end part of said shank portion,
and an anti-stick plastic coating covering the outside of said flange on said roller to prevent said roller when heated from sticking to the material to be heat sealed.

2. In a heat sealing device,
the combination comprising a roller made of sheet metal and having a disc portion formed with a generally cylindrical peripheral flange,
a handle made of wire and having a flattened inner end portion,
pivot means rotatably connecting said disc portion to said flattened end portion,
said handle having a grip portion at the outer end thereof,
said handle having a shank portion extending between said grip portion and said flattened end portion,
a heat-resistant plastic coating covering the grip portion of said handle and part of said shank portion, and an anti-stick plastic coating covering the outside of said flange on said roller to prevent said roller when heated from sticking to the material to be heat sealed.

3. The combination of claim 2,
in which said anti-stick coating is made of Teflon.

4. The combination of claim 2,
in which said anti-stick coating is made of silicone rubber.

5. The combination of claim 2,
in which said plastic coating on said handle is made of an epoxy composition.

References Cited by the Examiner
UNITED STATES PATENTS

| | | | |
|---|---|---|---|
| 1,204,009 | 11/1916 | Goodwin | 30—347 |
| 2,562,821 | 7/1951 | Rothweiler | 150—499 |
| 2,614,953 | 10/1952 | Anglada | 156—582 |
| 2,924,694 | 2/1960 | Kreider | 156—582 |

EARL M. BERGERT, *Primary Examiner.*
DOUGLAS J. DRUMMOND, *Examiners.*